United States Patent

Passey et al.

[11] Patent Number: 5,290,578
[45] Date of Patent: Mar. 1, 1994

[54] PROCESS FOR PREPARING LOW-CALORIE NUTS

[76] Inventors: Chand A. Passey, 1583 Sabrevois, Beloeil, Quebec, Canada, J3G 6A6; Narayan D. Patil, 95 Baseline Road, Apt. 307, London, Ontario, Canada, N6J 4X3

[21] Appl. No.: 856,149
[22] PCT Filed: Sept. 19, 1990
[86] PCT No.: PCT/CA90/00296
  § 371 Date: Mar. 30, 1992
  § 102(e) Date: Mar. 30, 1992
[87] PCT Pub. No.: WO91/04678
  PCT Pub. Date: Apr. 18, 1991

[30] Foreign Application Priority Data
  Sep. 29, 1989 [CA] Canada ........................... 615387

[51] Int. Cl.$^5$ ................................................. A23L 1/36
[52] U.S. Cl. ........................... 426/417; 426/425; 426/429; 426/430; 426/632; 554/9; 554/11
[58] Field of Search ............ 426/417, 425, 429, 430, 426/632; 554/9, 11, 15, 16, 17

[56] References Cited

U.S. PATENT DOCUMENTS 4,775,544 10/1988 Brown et al. ..................... 426/632

FOREIGN PATENT DOCUMENTS 63-94951 4/1988 Japan.
1-243969 9/1989 Japan.

OTHER PUBLICATIONS

Goodrum, et al. 1987. "Peanut Oil Extraction with SC-$CO_2$", 200 *Transactions of the ASAE*, vol. 30(6), Am. Society of Agricultural Engineers, pp. 1865-1868.

*Primary Examiner*—Helen F. Pratt
*Attorney, Agent, or Firm*—Jones, Tullar & Cooper

[57] ABSTRACT

A process for preparing nuts, particularly peanuts, of reduced calorific value by partially extracting oil from the nut kernels by extraction with supercritical carbon dioxide. The process involves pretreatment of the kernels, including their humidification and optional microwaving. The pretreatment and the extraction steps are optimized with a view to removing maximum amounts of high-calorie substances without losing the organoleptic qualities of the nuts. The process produces virtually unbroken peanut kernels.

17 Claims, 3 Drawing Sheets

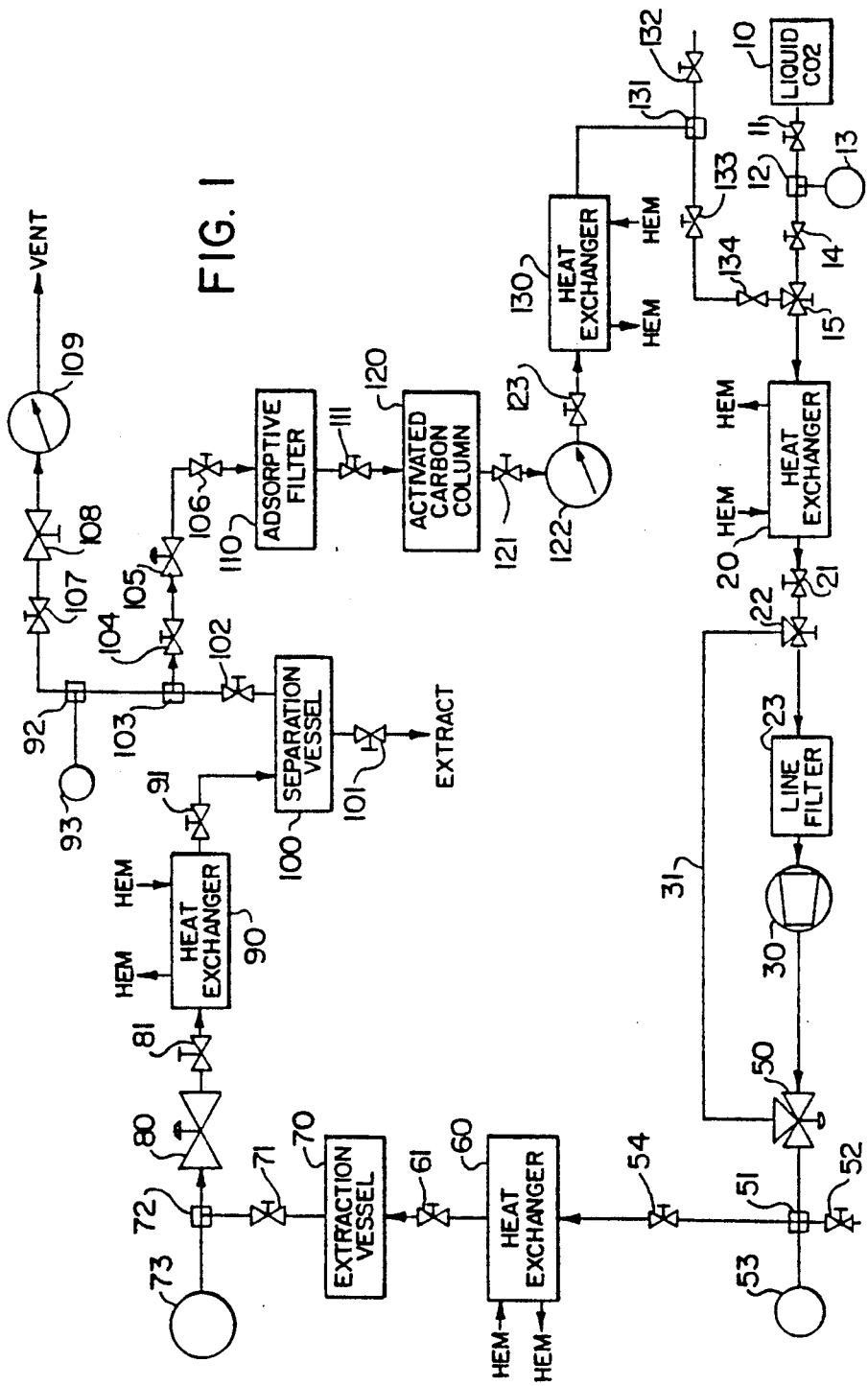

PROCESS FOR PREPARING LOW-CALORIE NUTS

This invention relates to an extraction process for preparing low-calorie nuts, for instance peanuts, and more particularly to a process involving supercritical carbon dioxide extraction of such nuts, and is especially applicable to products wherein breakage of kernels is to be prevented.

BACKGROUND OF THE INVENTION

Peanuts in various product forms are recognized as nutritious and palatable snacks by consumers in all age groups. Actually, their high calorific value has recently become of concern. Blanched raw peanut kernels contain about 46 to 50% fat accounting for 70% of their calories. Just 100 g of raw peanuts, or dry roasted peanuts, or peanut butter contains as much as 550 to 600 calories. In this diet conscious world, it is therefore conceivable that low-calorie peanuts retaining their original flavor, aroma and shape would easily replace the higher calorie peanut (or other nut) products if the prices were reasonable. It has also been shown by Pominski et al, J. Ame. Oil Chem. Soc., 41, 66–68 (1964) that low-calorie, partly defatted peanuts have a longer shelf life due to the reduced oil content.

For at least two decades, many efforts have been made to prepare high-quality, low-calorie peanuts by their partial defatting, possibly without a significant loss of shape, aroma, color and organoleptic qualities. One of these approaches has employed extraction with organic solvent(s), notably hexane; another has used mechanical pressing. Some of the problems of the hexane extraction processes include excessive stripping time and high temperature required to remove the last traces of hexane. These factors adversely affect the organoleptic quality of extracted peanuts, and this approach has not gained much commercial acceptance.

A method of mechanical pressing of peanuts was proposed in 1967 by Vix et al, U.S. Pat. No. 3,294,549. Blanched peanuts with a moisture content of about 5% are mechanically pressed to remove 50 to 80% of the oil. The pressed, misshapen peanuts are then submerged into hot water to expand them back to their original size and shape. The expanded peanuts must then be dried to achieve reasonable shelf life. This process, however, causes considerable splitting (12 to 43%) and breakage (3.6 to 46%) of peanuts. Also, the soaking of pressed defatted peanuts in hot water resulted in a loss of about 5% of the water solubles, mainly sugars and proteins.

Wilkins et al, U.S. Pat. No. 4,466,987, discloses a process for preparing low fat nuts, such as peanuts, wherein the nuts are initially moistened and then roasted prior to pressing them to remove a limited amount of the oil. The pressed nuts are then hydrated to cause them to reconstitute approximately to their normal shape during a final roasting.

Roselius et al, U.S. Pat. No. 4,328,255, teaches a method of extracting coffee oil containing aromatic constituents in high yield and in stable form by extracting solid, roasted coffee with dry carbon dioxide under supercritical conditions of temperature and pressure.

Other investigators have used supercritical fluid extraction (SCFE) processes essentially to extract oil from oilseeds, e.g. soybeans, rapeseed/canola oil corn germ and sunflower. However, since the extraction of oil was the main goal of such work, the oil seeds were cut, flaked, cracked and/or ground to increase the rate of oil extraction.

It was the goal of these authors to develop a process for defatting peanuts, and conceivably other nuts, at least partially while keeping the kernels intact as far as possible. Of course, the disadvantages related to the hexane (or another organic solvent) extraction were to be avoided, and the organoleptic qualities of these popular snacks to be maintained to a maximum degree.

SUMMARY OF THE INVENTION

The present investigators have recognized that it is advantageous to use supercritical gases, particularly $CO_2$, to extract oils and other high-calorie constituents from peanuts and other nuts. Carbon dioxide is neutral from the point of view of taste, inert and easy to remove after extraction. However, as found in the experiments, reported hereinbelow, peanuts tended to be crushed at the pressures at which supercritical carbon dioxide ($SC-CO_2$) was effective in extracting oil, or its appreciable portion and other non-fat matter, from the peanut kernels.

Our endeavors centered on the preconditioning of unbroken peanuts so as to make them resistant to crushing during extraction, and on the optimization of the extraction step. The following pretreatment methods were experimented with: soaking, steaming and humidification. The details of the experiments are given hereinbelow. The effect of microwave treatment and ionizing radiation on the subsequent extraction results was also investigated.

Regarding the extraction, the following modes were tried:

continuous extraction with $SC-CO_2$, without any hold nor decompression, hold-and-extract modes, wherein each extraction step was preceded by a hold in liquid or supercritical $CO_2$, with or without partial decompression.

In accordance with the invention, it has been discovered that humidification, under the conditions specified hereinbelow, eliminated the problem of breaking and crushing of peanuts at the high extraction pressures required for enhancing the extraction rate. Humidification did not cause browning (discoloring) of peanuts, nor their spoilage. The soaking and steaming pretreatments have proven inferior because, while effective in preventing peanuts from being crushed, they caused browning of peanuts, loss of water solubles, and relatively low rate of extraction compared to humidification.

It has been found, more particularly, that the moisture content of raw peanuts, typically about 5%, should be raised to from 7% to 14%, preferably 8–11% to bring about the most favourable extraction results. The temperature of humidification should be 30°–80° C., preferably 50°–70° C.

Following the humidification pretreatment and optional short exposure of the nuts to microwave energy, the nuts are extracted with carbon dioxide under supercritical conditions of temperature (above 31.05° C., preferably up to 90° C., particularly from 50° to 65° C.) and pressure (25–50 MPa, preferably 35–50 MPa). The extraction can be carried out continuously to the desired degree of oil removal. It has been found unexpectedly that better results, in terms of the amount of oil removed, are obtained when the extraction is carried out in stages separated by holding periods.

BRIEF DESCRIPTION OF THE DRAWINGS

FIG. 1 is a schematic diagram of the supercritical fluid extraction system used to carry out the process of the invention.

DETAILED DESCRIPTION OF THE INVENTION

Figure 2A:
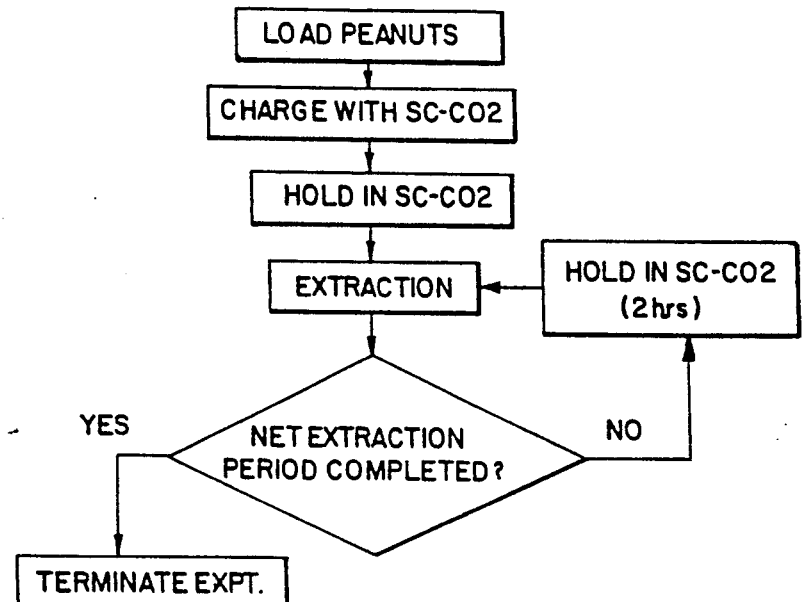
FIGS. 2A, 2B, 2C are process flowcharts illustrating various hold-and-extract process modes.

The invention is described hereinbelow with particular reference to peanuts. These constitute a very popular food product and a reduction of their caloric value is particularly desirable. However, it is to be understood that this invention is aimed a the preparation of unbroken kernels of several other nuts—hazel nuts, almonds, Brazil nuts, pistacchios, cashews etc. which contain high-calorie oils soluble in carbon dioxide. Due to differences in the texture, oil content and initial moisture content of such nuts, sometimes varying from batch to batch, it is almost impossible to submit an "omnibus" set of optimum conditions for preparation of low-calorie products from every species. Certain routine optimization work may be therefore-necessary without detracting from the spirit and scope of the invention.

Throughout the disclosure, the definition "kernels" denotes whole kernels, or halfs or their mixture where the nuts have a natural tendency to split in half; at no point are the kernels roasted nor intentionally broken.

Pretreatment

Experiments were conducted on several pretreatment methods to condition peanut kernels, including soaking, steaming and humidification, in order to prevent crushing of kernels in the subsequent extraction step. We also experimented with humidification combined with microwave and gamma irradiation.

For soaking, peanuts were soaked in deionized water (1:1 w/w) at about 23° C. and 5.77 pH, for periods of 10 min, 30 min, 1 hr and 6 hrs, drained and stored in the refrigerator overnight. For steaming, peanuts were subjected to steam at about atmospheric pressure for periods up to 5 min. Though the soaked peanuts withstood the high extraction pressures, the soaking pretreatment was not pursued further as it tended to change the color of the peanuts to a darker brown, and resulted in a high post-extraction moisture content which would require an additional drying step for ensuring storage stability. There were also losses of water solubles. Steaming pretreatment was also abandoned for similar reasons.

Humidification was carried out so as to bring the moisture content of peanuts to a desired range while avoiding the presence of free moisture, or condensation, on the surface of kernels, the moisture content to be sufficient for the kernels to withstand the extraction pressures.

We used a pair of laboratory desiccators (BELART, Model F42025) hereinafter referred to as "humidification vessel" in conjunction with a constant temperature water bath (BLUE M, Model 1140A-1). The lower portion of the humidification vessel (i.e. below the separator screen to keep the product separated from the material below) was filled with water, and about 600 g of material to be conditioned (in this case raw blanched peanuts) were put on the top of the separator screen. The humidification vessels were closed and put in the water bath, submerging the lower portion of the vessels.

The humidification of the material takes place within the vessel by evaporation of water in its lower portion and contacting of vapours so formed with the product above the separator screen. If desired the water used can be demineralized water with or without any food-grade additive, and the air in the humidification vessel may preferably be evacuated with or without replacement with an inert gas such as nitrogen or carbon dioxide, for example, to prevent oxidation during humidification.

Usually, the humidification pretreatment was commenced in the morning. After humidification, the humidification vessels were removed from the water bath and held overnight at room temperature until the pretreated peanuts were required for loading in the extraction vessel the following day.

The humidification conditions, described in detail in Table I below, were such that the moisture content of peanut kernels was uniformly raised from an initial moisture content of about 3-6% (average about 5%) to about 7-14%, preferably 7-11%, and there was no free moisture present on the kernels to cause their spoilage. Hence refrigeration of humidified material was not necessary for overnight hold.

However, if longer delay is anticipated between finishing of humidification pretreatment and start of extraction, the material can be stored at refrigeration temperature.

The humidification step can be carried out, of course, by any other means that will bring peanuts in contact with water vapour without causing free moisture on the kernels, to bring the moisture content to the optimum range as described herein.

It should be appreciated that certain nuts, for instance almonds, may already, in the initial, or raw, condition, contain a moisture level that is sufficient to prevent the breakage of the kernels in the course of subsequent $CO_2$ extraction. In such a case, no humidification is necessary. This, however, should not be considered as detraction from this invention.

Tests were also conducted to assess the effect of microwave treatment on the extraction results. For microwave treatment, the peanuts were spread in a Kenmore 1.1 cu.ft., 1.4 KW microwave oven in monolayers. Two different techniques were explored:

i) one step microwaving after the required conditioning by humidification, and ii) a multiple step microwaving of the partially humidified peanuts, rehumidifying, and remicrowaving.

It was hypothesized by the authors that ionizing radiation may weaken the cell walls in peanuts, thereby increasing their permeability to solvents. Raw peanuts were pretreated with gamma irradiation to an absorbed doses of 2 and 4 kGy in a Cobalt-60 pilot-size irradiator. The irradiated peanuts were then humidified and microwaved prior to the extraction.

Extraction Equipment

An embodiment of the system for carrying out the extraction process of the present invention is shown schematically in FIG. 1.

In the description below, the term "liquid carbon dioxide" ($LCO_2$) is used to refer to the liquid phase of carbon dioxide below the critical temperature (31.05° C.) and critical pressure (7.39 MPa), "supercritical carbon dioxide" ($SCCO_2$) to refer to carbon dioxide at temperature and pressures above the critical, "supercritical fluid" (SF) to refer to carbon dioxide for which at least the pressure is above the critical, "dense phase" to refer to the extracting medium at pressures higher than that prevailing in the separation vessel, and the term "nondense phase" to refer to the extracting medium at pressures not exceeding that in the separation vessel.

The extraction system for carrying out the extraction process of the invention essentially comprises of a source 10 of make-up $LCO_2$, a cooling heat exchanger 20 for maintaining the $LCO_2$ at a temperature below 4° C. to avoid vapor-logging of liquid pump 30; a $LCO_2$ pressurizing means comprising a liquid pump 30 for pressurization of $LCO_2$, a back pressure regulator 50 for controlling the maximum pressure at the pump discharge by recycling via by-pass line 31 some or all of the $LCO_2$ (pumped in excess of system requirements) to the mixing valve 22 wherein it mixes with make-up $LCO_2$ on its way to the pump inlet via line filter 23; a solvent preheater/cooler 60 for adjusting the temperature of the dense phase carbon dioxide to a level suitable for the extraction process (i.e. for keeping it below the critical temperature if the extracting medium is required as $LCO_2$, or for heating it to a temperature above the critical to change it to $SCCO_2$), an extraction vessel 70, a pressure regulator 80, a flow control valve 81, an extract phase heat exchanger 90 for heating/ cooling the dense phase carbon dioxide laden with extracted material to a temperature suitable for separating the extracted material from the extracting medium leaving the extraction vessel, a separation vessel 100; and also including a subsystem comprising a tee 103, a shut-off valve 104, a pressure regulating valve 105 for maintaining the pressure in this subsystem at about 5.5 to 6.9 MPa, an adsorptive filter 110 and an activated carbon column 120 including a sight glass for visual inspection of the cleanliness of the nondense phase carbon dioxide being recycled, a flow rate indicator 122, a recycle solvent cooler 130 for changing the nondense phase carbon dioxide to $LCO_2$ for recycling, and a mixing valve 15 wherein the $LCO_2$ for recycling mixes with the make-up $LCO_2$ on its way to the liquid pump 30. Also included is a subsystem, for the once-through operation or depressurization of the system, connected to the said tee 103 and comprising a shut-off valve 107, flow control valve 108, and a flowmeter/totalizer 109.

All other shut-off valves 11, 52, 54, 61, 71, 91, 101, 102, 106, 111, 121, 123, 132 and 133; check valves 14, 21 and 134; tees 12, 72, 92 and 131; cross 51; pressure gauges 13, 53, 73 and 93; and piping and fittings for interconnecting the various components and subsystems as shown in FIG. 1; as well as other piping, fittings and controls required for improved safety, which are not specifically shown but would be obvious to one skilled in the art, are included in the proposed system.

The head of the pump 30 needs to be cooled to prevent its vapour-logging due to vaporization during compression. Also, as shown in FIG. 1, the cooling heat exchanger 20 and recycle solvent heat exchanger 130 require cooling medium to be circulated through them. The solvent preheater/cooler 60, on the other hand, requires a heating medium to change the pressurized $LCO_2$ to $SCCO_2$, except when the extraction vessel has to be charged with $LCO_2$ during the hold-and-extract process modes of FIGS. 2B and 2C when this heat exchanger uses a cooling medium to keep the temperature of $LCO_2$ below the critical temperature. The extract phase heat exchanger 90 also requires a heating/cooling medium for adjusting the temperature of the extract phase (dense phase carbon dioxide laden with extracted material) to a level suitable for the separation process. Subsystems for supplying the heating and/or cooling mediums (referred to as heat exchange medium, HEM) to these various heat exchangers are also included in the system.

Further the flow control valves 81 and 108 are heat-traced to prevent freezing due to relatively large pressure drops through them (from 30–50 MPa in the extraction vessel to 5.5–6.9 MPa in the separation vessel, and from the latter to the vent pressure respectively).

While only one extraction vessel is shown in FIG. 1, there may be more than one extraction vessel with their loading and the processing of material loaded therein being sequenced so as to carry out extraction of several batches (at different stages of extraction) simultaneously to achieve a semi-continuous production. Similarly, there may be plurality of other components as well.

As can be seen from FIG. 1, the equipment can be operated in two ways:
a) the recycle mode—wherein the valves 107 and 132 are kept closed, and the valves 104, 105, 106, 111, 121, 123 and 133 are open during operation; or
b) the once-through mode—wherein the valve 104 is kept closed (valve 132 may be open), and the valve 107 is open with the flow control valve 108 suitably adjusted, the two valves (107 and 108) together creating the necessary pressure drop from that in the separation vessel to the vent pressure while allowing the regulation of flow rate in conjunction with the flow control valve 81.

In the once-through mode, before being vented, the carbon dioxide gas may be passed through cold-trap(s) or adsorptive filter(s) and column(s) such as 110 and 120 for capturing any volatiles.

The loading, start-up and extraction procedures are more or less similar and common to both the recycle and the once-through modes of operation. In what follows, these procedures are described with particular reference to the recycle mode.

Loading and start-up procedure

The following main steps are involved:
a) Initially, the whole system is at atmospheric pressure, and the heating/cooling mediums are off i.e. not circulating through various heat exchangers.
b) The position of various valves at start-up is as follows:
valves fully closed: 11, 52, 54, 61, 101, 104, 107, 111, 123, 132
valves fully open: 71, 91, 102, 106, 121, 133
valves slightly open: 50, 80, 81, 105, 108
c) The refrigeration unit for providing coolant for the head of the liquid pump 30 and other cooling heat exchangers is started and the circulation of coolants established. Heating medium flow through the heating heat exchangers is also established.
d) Material to be extracted is loaded into the extraction vessel 70, taking care to follow all the safety precautions in properly opening and closing high pressure vessels. The system is now ready for pressurization.
e) Primary pressurization of the system: To avoid frosting of the pipes and valves during final pressurization, it is necessary first to equalize pressure in the $LCO_2$ source 10 and the rest of the system. For doing so, valve 11 is opened momentarily and then closed. Valve 54 is now opened and when no more gas is flowing through valve 61 is opened and pressure allowed to equilibrate in the system up to the next closed valve in the flow path. When no more gas is flowing through, valve 104 is now opened and pressure allowed to equilibrate to the next closed valve as above. Similarly, valves 111 and 123 are opened, allowing the time for pressure to equalize. Pressure in the system indicated by pressure gauges 53, 73 and 93 should now be equal. The valve 11 is again opened momentarily and then closed allowing the $LCO_2$ that enters the system to flow through and equalize. The procedure is repeated until the pressure throughout the system (indicated by pressure gauges 53, 73 and 93) is the same as at the source 10 of $LCO_2$, about 6.2 MPa (5.5–6.9 MPa) as indicated by pressure gauge 13.

After the system pressure has equilibrated, valve 11 is fully opened and the valve 81 is gently closed.

f) Pressurization and heating—For pressurization of the system, valves 61 and 71 are closed and the valve 52 is crack-opened until dry ice (formed as the pressure of $LCO_2$ is reduced to below the triple point) is coming out whereafter it is closed. The liquid pump 30 is started and the flow rate is adjusted. The back pressure regulator 50 is now adjusted to the desired pressure (indicated by pressure gauge 53), the pressure reading depending upon the stage of operation: when charging with $LCO_2$, the pressure will be about 5.5 to 6.9 MPa at the start of the pump; and when the vessel has been charged and/or when $SCCO_2$ is circulating, it will range from about 30 to 50 MPa.

Valve 61 is now opened very slowly to pressurize the extraction vessel, allowing sufficient time for pressure to stabilize on the gauge 53.

The heating means for heating the extraction and separation vessels are set to maintain desired temperatures therein and heating is started.

We maintained temperatures ranging from 30° C. to 90° C. in the extraction vessel as shown in Tables I, II, III, VII and VIII). Temperature in the separation vessel was also maintained at the same level as in the extraction vessel (isothermal separation). The heat tracing means of the valves 81 and 108 was adjusted to 70° C. and turned on.

The system is now ready for commencing extraction.

The Extraction Process

Figure 2B:
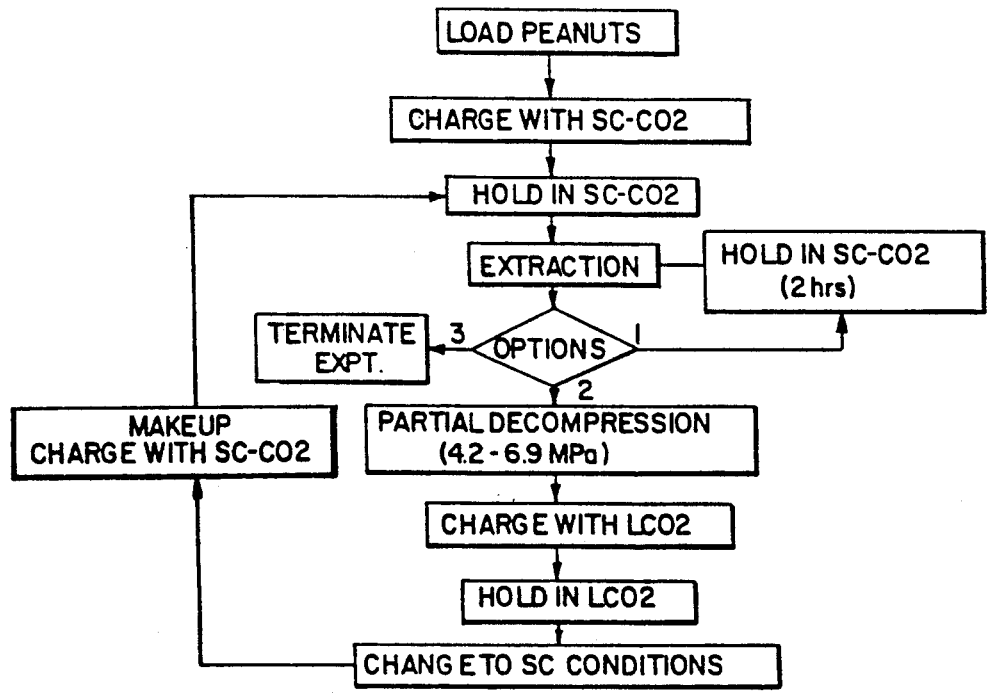
Figure 2C:
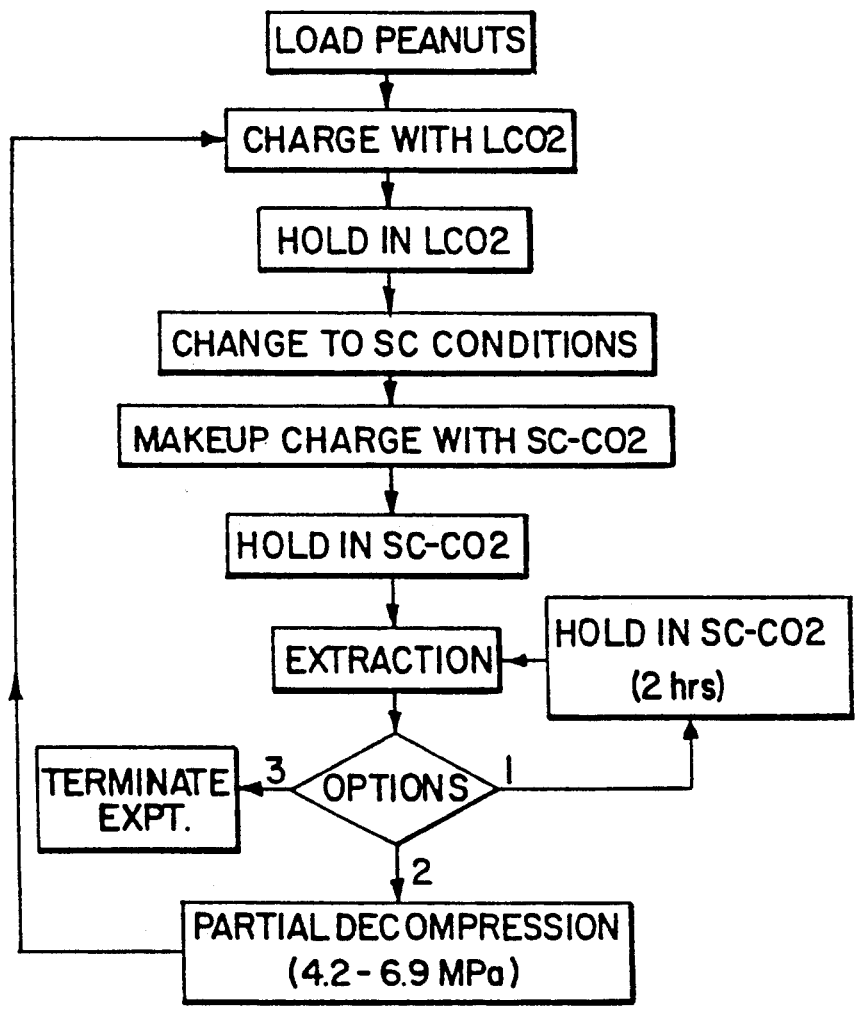

The continuous mode, and the three hold-and-extract modes of operation shown in FIGS. 2A, 2B and 2C, are briefly described below.

To commence extraction, liquid pump 30 is started if not already running. The valve 104 is fully opened if it is not already open. The valves 61 and 71 are gradually opened along with pressure regulator 80 and the flow control valve 81 being adjusted to maintain desired pressure in the separation vessel 100 (5.5–6.9 MPa, indicated on gauge 93). The pressure regulator 105 is adjusted to maintain the desired pressure in the recycling subsystem.

For the make-up $LCO_2$ to be able to enter the mixing valve 15, the pressure in the $LCO_2$ source 10 will have to be compatible with that prevailing at the said mixing valve in the recycle subsystem. If necessary the make-up source 10, e.g. $LCO_2$ cylinder(s), can be warmed to raise the pressure therein.

The caloriferous material extracted from the material in the extraction vessel 70, and collected in the separation vessel 100, can be removed from the separation vessel by opening the valve 101 as and when required.

Continuous mode of extraction—The pretreated peanuts are loaded and the operation started as described above. Once the conditions have stabilized the extraction proceeds without interruption or intermediate partial decomposition and recharging. It may, however, be advantageous to vary the pressure in the extraction vessel in a controlled manner as the extraction progresses.

Hold-and-extract mode without decompression—This extraction mode is shown schematically in FIG. 2A. It differs from the continuous mode in that during the start-up procedures, after loading the peanuts, the extraction vessel is initially charged with $SCCO_2$ and the valves 61 and 71 are closed and held closed for the duration of the initial hold period (in this case we maintained an overnight hold to suit the work schedule of the lab). The liquid pump 30 may be stopped during this hold period.

With multiple extraction vessels, the other extraction vessels can be loaded and prepared during this hold period so that the work of loading, extraction and unloading can proceed from one extraction vessel to the other to provide a semi-continuous production.

After this initial hold, liquid pump 30 is started if not already running, and valve 61 is opened and so is valve 71 in accordance with the procedures noted above and the extraction proceeds as described above for 1–2 hrs (an extraction step) after which the valve 71 followed by valve 61 are again closed to provide a hold in $SCCO_2$ of about 2 hours (hold step). The extraction step and hold step are repeated as required to meet the product criteria or until the incremental extraction (relative amount of caloriferous material extracted during an extraction step) ceases to be cost-effective. Again, it may be advantageous to vary the pressure in the extraction vessel in a controlled manner during the extraction step(s).

Hold-and-extract mode with decompression and intial charge with $SCCO_2$—This extraction mode is shown schematically in FIG. 2B. However, it differs from the mode of FIG. 2A in that the extraction is carried out in two or more stages with interstage decompression of the extraction vessel 70.

The first extraction stage is completed essentially as per mode of FIG. 2A with two or more extraction steps with intervening hold steps.

At the end of the first extraction stage, the following additional steps are carried out to prepare the system for the next extraction stage:

a) Interstage decompression: The liquid pump 30 is stopped and valves 61 and 104 are closed. The pressure in the extraction vessel 70 is gradually lowered by gradually opening the valve 107 and adjusting the valves 80, 81 and 108 to maintain the flow rate while ensuring that the valves or the pipeline won't freeze-up as the pressure is lowered. When pressure in the extraction vessel (indicated on gauge 73) is about the same as in the separation vessel 100 (indicated on gauge 93), the valve 104 is opened and decompression continued. After decompression to about 4.2–6.9 MPa (indicated on gauge 73), valves 71 and 107 are fully closed, and the valves 80 and 81 are first closed and then slightly opened in preparation for charging the extraction vessel 70 with $LCO_2$ as follows.

b) Charging with $LCO_2$—At the same time that decompression was started, settings for temperature in the extraction vessel 70 and the solvent preheater/cooler 60 are lowered to below the critical point (a temperature of 30° C. was used).

When the temperature in the extraction vessel 70 and the solvent preheater/cooler 60 has reached below the critical, valve 61 is opened and a weighed quantity of $LCO_2$ (calculated to fill the void volume and empty space in the extraction vessel) is allowed to enter the extraction vessel 70 so as to submerge the material being extracted in the $LCO_2$. (The weighed quantity may be loaded by using, for example, a cylinder of $LCO_2$ mounted on a weighing scale.) If necessary, the liquid pump 30 may be started. After charging with $LCO_2$ as above, valve 61 and 11 are closed.

c) Holding in $LCO_2$—With the valves 61 and 71 closed, the material being extracted is held in the $LCO_2$ for 2 or more hours.

d) Changing to $SCCO_2$—The settings for temperature in the extraction vessel 70 and the solvent preheater/cooler 60 are raised back to the supercritical extraction temperature to be used (settings of 32°–90° C. were used).

e) Make-up charge with $SCCO_2$—With the valve 71 still closed, valve 11 is opened and liquid pump 30 is started if not already running. Valve 61 is opened and the extraction vessel 70 is pressurized by following procedures that should be evident from the description given hereinbefore. The valve 61 is now closed again to continue hold in the $SCCO_2$ (see below).

f) Hold in $SCCO_2$ followed by extraction—This step is identical to the extraction according to mode of FIG. 2A or the first extraction stage of the mode of FIG. 2B.

This completes the second extraction stage in accordance with the mode of FIG. 2B. It may be further repeated as required to meet the product criteria or until the incremental extraction (relative amount of caloriferous material extracted during an extraction stage) ceases to be cost-effective.

Hold-and-extract mode with decompression and initial charge with $LCO_2$—This extraction mode is shown schematically in FIG. 2C. However, it differs from the mode of FIG. 2B in that while the extraction is still carried out in two or more stages with interstage decompression of the extraction vessel 70, the first extraction stage also begins with an initial charge with $LCO_2$. In the second (and any subsequent) stage of extraction, the extraction vessel 70 is charged with $LCO_2$ following the interstage decompression and the extraction follows the steps just as described above in the case of extraction mode of FIG. 2B.

Raw Material

Dry-blanched Virginia Runners variety peanuts were used for all the extraction experiments. On a wet basis, the peanuts contained 4.19 to 5.08% moisture, 41.90 to 48.75 crude fat, 22.91 to 26.48% proteins, 20.36 to 25.38% carbohydrates (including crude fibre) and other minor constituents, and 2.21 to 2.32% ash.

Analysis

The peanut samples were analyzed as-received, after pretreatment and after extraction, using standard AOAC methods, i.e. moisture content by vacuum oven method (#27.005), crude fat by gravimetric method (#27.006), and proteins by the Kjeldahl method applying a nitrogen conversion factor of 5.46 for the peanuts #27.007).

The calorific value of peanuts was determined for both the raw and extracted peanuts by measuring the heat of combusion of product using an Adiabatic Oxygen Bomb calorimeter (Parr Instrument Company, Moline, Ill., USA). The samples were prepared by grinding the peanuts in a Waring commercial blender (Model 33BL73) at low speed. About 0.7 to 0.8 g of ground peanut samples were used to form pellets, applying just enough pressure without squeezing out any oil.

Peroxide values (PV) and free fatty acid (FFA) content (expressed as % oleic acid) were determined on the oil samples according to the American Oil Chemists' Society (AOCS) methods No. Cd 8-53 and Ca 5a-40, respectively. Carbohydrate concentration in the soaking water and in the coextracted water phase was determined using Anthrone reagent.

Experimental Results

Experiments were performed to determine an optimum set of humidification conditions to be combined with supercritical carbon dioxide ($SC-CO_2$) extraction of peanuts so as to prepare low-calorie kernels without crushing, breaking or otherwise deshaping the kernels. The results are set forth in Table I.

The effect of one-step microwaving of humidified peanuts on the subsequent extraction of oil was investigated. The results are present in Table II.

The effect of different pretreatment methods humidification vs. soaking—on the oil extraction rate, kernel breakage, rancidity of oil removed, free fatty acid content, and loss of soluble solids was investigated. The results are set forth in Tables III-V.

Effect of pretreatments on the color of the extracted peanuts and peanut oil (as well as nat of the pretreated peanuts prior to extraction) was studied, and the results are presented in Tables VI(a) and VI(b). Color measurements were made with Hunterlab LABSCAN II Spectrocolorimeter.

The color is described in terms of the tristimulus color parameters "L", "a" and "b" (F. J. Francis and F. M. Clydesdale, 1975, "Food Colorimetry: Theory and Applications", AVI Publishing Company). The parameter "L" measures lightness and varies from 0 for perfect black to 100 for perfect white. The "a" measures redness when (+), gray when zero (0) and greenness when (−). The "b" measures yellowness when (+), gray when zero (0) and blueness when (−). Results are presented in Tables VI(a) and VI(b) are for the "daylight" illuminant D65.

Compared to the white standard (L=91.32, a=−1.05, and b=1.32) the raw peanuts (L,a,b=62.27, 3.36 and 19.36) when extracted became whiter but slightly more gray. Peanuts extracted after soaking for 10 min were whiter and grayer than the peanuts extracted after humidification, the latter being slightly whiter but closest in color after extraction with raw unextracted peanuts. Longer soaking time made the extracted peanuts look darker compared with the unextracted raw peanuts. The oil extracted from raw unpretreated peanuts had a negative value for "a" indicating a very slight greenish hue. This was matched only by the oil extracted from the humidified peanuts. Thus only with the humidification pretreatment is the color of extracted peanuts or oil closest to the color of raw peanuts or oil extracted therefrom.

In Table VI(b) we have calculated the Total Color Difference and Chromaticity Difference of extracted peanuts and oil with respect to the raw unpretreated unextracted peanuts and oil extracted therefrom. Again, the humidified peanuts show lower total color and chromatic differences than the 10 min soaking time. The extracted peanuts made from peanuts soaked for longer times, though showing smaller differences, suffer from other problems, e.g. higher moisture content (require additional drying which is bound to darken them and aggravate the color and chromatic differences), higher levels of FFA or PV (hence decreased storage stability) and lower oil removal rate.

The results of extracting humidified (but not microwaved) peanuts by the continuous and hold-and-extract (H+E) mode without decompression (FIG. 2A) have been set forth in Table VII for comparison. Higher extraction pressure leads generally to higher oil extraction. This is confirmed by experiment set No. 16 (10.2% oil removed at 40.5 MPa) and No. 31 (5.6% oil removed at 34.8 MPa) under continuous extraction mode. Under the hold-and-extract mode (experiment set No. 32), oil removed reached 15.8% at an intermediate extraction pressure of 38.6 MPa. At higher pressure, the amount of oil removed is expected to increase further.

A number of experiments were conducted to compare results obtained for the hold-and-extract mode (FIG. 2A) with and without microwave conditioning. Multiple step humidification and microwaving pretreatment was used for the experiments. The results, however, are not conclusive as to the effect of longer total microwave treatment periods on the percentage amount of oil removed.

In Table VIII, the results obtained for the three hold-and-extract process modes are compared under identical pretreatment conditions, and extraction pressure (about 44 MPa) and temperature (about 61° C.). The small deviations are well within the ranges of experimental controlability.

Discussion

As can be seen clearly from the above experimental material, $SCCO_2$ is effective in preparing reduced-caloric nuts but the kernels are crushed at the typical pressure conditions. Soaking and steaming pretreatments are effective in preventing peanuts from being crushed but they cause browning of peanut kernels, loss of water solubles and low rate of extraction.

As shown in Table I, the moisture content of peanuts after 6 hours or more of extraction was about 5-7%, thus eliminating the need for further drying. The humidification raised the moisture content, before extraction, from about 5% to about 7-14% at which range kernel crushing was substantially prevented.

As can be seen from experimental results in Table I, it was found that humidifying Virginia Runners peanuts for 4-7 hours with water bath adjusted to 70° C. gave good results in terms of protecting the peanuts against breakage during extraction at 32-40 MPa in the extraction vessel. We subjected humidified peanuts to extraction pressures of up to 46 MPa (see experiment set No. 41 in Table VIII) and to extraction temperatures of up to 90° C. (see experiment set No. 18 in Table I) with good results. Compared to the soaking pretreatment, product color was also better with humidification [see results in Tables VI(a) and VI(b)].

It should be noted that humidification for as little as 2.5 hours (at 50° C.) was sufficient to prevent crushing On the other hand, humidification for 1 hr at 70° C. was not sufficient to prevent crushing. The peanut powder found in the extraction vessel was generally higher at higher humidification temperature (i.e. 70° C.) the shorter the humidification time. Also, at lower extraction pressures (e.g. experimental set No. 1), the humidification time and temperature can be reduced without the peanuts being crushed during extraction or excessive formation of powder.

It should also be noted that some water phase is co-extracted with the oil phase which also contributes to caloric reduction. The volume of the co-extracted water phase depends, among other things, on the moisture content of (pretreated) peanuts loaded in the extraction vessel. Other things being equal, the volume of co-extracted water phase is generally higher:

the higher the initial moisture content (MCI) (see Table I: #5 vs #8; #6 vs #7; #13 vs #16);

the higher the extraction temperature (see Table I: #14 vs #15; #10 vs #18; #14 vs #15); or the higher the extraction pressure (Table I: #9 vs #11).

The time and temperature for humidification needs to be optimized for each product or variety and the extraction conditions to be used to prevent crushing, and improve caloric reduction (by minimizing co-extracted water phase and maximizing oil extraction), and product color and quality (crunchiness, storage stability), etc. All these objectives are better achieved by humidification rather than by soaking (see Tables III, IV, V, VIa, VIb).

The results presented in Table II show that microwaving humidified peanuts for more than 3 min (at 1.4 kW) caused crushing at extraction pressures of 28-31 MPa, perhaps due to drying out of peanuts to about 7% or less. On the other hand, microwaving for 2.5 min helped increase the oil extraction slightly (compare Table I, No. 15 with Table II, No. 25) without the peanuts being crushed.

A series of experiments, reported in Tables III, IV, V, VI(a) and VI(b), were conducted. The results obtained with soaking pretreatment are compared with those obtained with humidification (Table II).

As can be seen from the results presented in Table III, there was considerable breakage when raw peanuts were extracted without any pretreatment.

With the soaking pretreatment, the moisture content of soaked peanuts increased rapidly with the soaking time from about 12% for 10 min soaking to 33% for 360 min soaking. The moisture content of extracted peanuts was also correspondingly higher, varying from about 8% for 10 min soaking to about 27% for the 360 min soaking. While there was no breakage during extraction, and about 95-99% of peanut kernels remained intact with the soaking pretreatment, the extracted peanuts after prolonged soaking (>10 min) must be dried back to 5-8% moisture content if spoilage is to be prevented at room temperature.

With the humidification pretreatment, the moisture content of humidified peanuts was also about 12% before extraction and 8% after extraction. However, the latter was quite a bit higher than the usual 3-6% moisture content previously observed for humidified peanuts in other similar experiments (Table I: #14–18). While the 10 min soaking does seem comparable with the humidification in terms of pre- and post-extraction moisture content, the oil and the nonfat matter removed were respectively 10% and 5% less than with the humidification pretreatment.

The free fatty acids (FFA) content (a measure of enzymatic change) and the peroxide value (PV) (a measure of rancidity) of oil remaining in the peanuts can be used as indicators of expected storage stability.

As seen in Table IV, the FFA content and PV value of oil originally present in the raw peanuts not subjected to supercritical extraction was estimated at 0.16 units (expressed as % oleic acid) and 0.45 units (milliequivalent of peroxide/kg of sample) respectively.

Measurements over time on peanuts extracted in experiment No. 37 (Table IV) show that the FFA and PV levels of extracted oil (time "0") are higher than the overall average for the oil remaining behind in the peanuts, indicating that oil near the peanut surface is more prone to deterioration than that present in the depths of the kernel. Therefore, FFA and PV levels of oil removed were measured. Moreover, the FFA content of residual oil remained relatively constant over time (0.1 unit at time "0", 0.11 at time "2 months" and 0.12 units at time "4 months") and was much lower than that of the original peanuts (0.16 units at time "0"), indicating a reduction in FFA content due to extraction and little formation of FFA during storage. On the other hand, the PV value of residual oil was always higher than the PV value of raw peanuts, and it increased from 1.34 units at time "0" to 2.97 units at time "2 months" and then increased further to 17.11 units at time "4 months", indicating an increase in the PV values due to extraction and ongoing albeit slow increase in rancidity.

The soaking pretreatment caused a much higher level of PV, varying from about 27 units for 10 min soaking to about 53 units for 60 min soaking (very little sample of oil was collected for the 360 min soaking, so PV and FFA could not be determined for this pretreatment), as compared with only 9 units for the humidification pretreatment. The PV of oil extracted from raw (unpretreated) peanuts was about 3 units, indicating that most of the increase in PV value occurred due to differences in the pretreatments with only slight increase taking place due to the extraction per se. Peanuts and peanut oil extracted in accordance with our process (humidification pretreatment combined with extraction are therefore much less rancid (at PV of 9 units) than those prepared from soaking pretreatment (PV of 27 to 53+ units).

Further, the FFA content of oil extracted from raw (unpretreated) peanuts at 1.1. units was lower than that of the oil extracted from soaked peanuts (1.5 units for 10 min soaking, 1.6 for 30 min, and 1.2 units for 60 min soaking) or that of the oil extracted from humidified peanuts (2.1 units). This indicates that while there is only slight formation of FFA during any of the pretreatments and associated supercritical extraction, the slightly higher level of FFA in the oil removed in the case of extraction with humidification pretreatment leads to more effective removal of free fatty acids from the peanuts in view of the higher FFA concentration in and the higher quantity of the extracted oil, leaving behind better tasting low-calorie peanuts.

The peanuts extracted after humidification pretreatment should therefore store better than those prepared with even the least soaking time (10 min) required to prevent crushing.

The effect of pretreatment on loss of soluble solids has been illustrated in Table V. In the case of soaking pretreatment, the loss of water soluble solids mainly occurs during soaking. The combined loss of soluble solids is estimated to range from 0.71% for 10 min soaking to 1.4% for 60 min soaking.

In Table VIII the results obtained for the three hold-and-extract process modes have been compared under identical pretreatment conditions, and extraction pressure (about 44 MPa) and temperature (about 61° C.).

Modes 2b and 2c give better extraction than the mode 2a which in turn gives better extraction than the continuous mode.

As these experiments were run using humidification+microwave pretreatment, it is possible that the extractions would be even higher if only humidification [or humidification+a short time (1 min or so) exposure] had been employed as a pretreatment.

It will be understood that it is very difficult to define the effect of microwaving on the extraction results, since the power of microwave energy and time of exposure are interrelated. Other factors, as the dimensions of the cavity in which the energy is applied, may also be of importance. However, it is essential, as shown particularly in Table II, to expose the kernels to microwave energy for a time effective to enhance the permeability of cell walls but not for as long as to bring the moisture content before extraction (MCI) below about 7%, preferably about 8%.

Also, the time of extraction is not a crucial factor in the process of the invention. As explained hereinabove, the longer the time, the higher the yield of oil removed (of course, up to a maximum available). It may not be economical, in certain applications, to extend the time of extraction above a certain point dictated by the cost of the process.

It will be apparent to those skilled in the art that the particular extraction regime proposed by the instant invention, and particularly the hold-and-extract mode, illustrated in FIGS. 2A, 2B and 2C and explained in the disclosure, offers distinct advantages in terms of yield of caloriferous substances over the continuous $SCCO_2$ extraction process. Therefore, it is proposed that the particular extraction mode (hold-and-extract) can be applied also to crushed or comminuted nuts, where the preparation of whole kernels is not essential, and rather the oil plus crushed nut material of reduced calorific value are desired products.

As mentioned hereinabove, the extraction yields can be enhanced by varying the pressure in a controlled manner. This is achieved e.g. by cycling the pressure (beyond normal controllability range).

TABLE I

Screening of operating conditions for the humidification step prior to 5 hours continuous SC—CO$_2$ extraction.

| | Pretreatment Humidification | | Extraction | | | Observations | | | | | Peanut Powder | # of |
|---|---|---|---|---|---|---|---|---|---|---|---|---|
| Expt. set | Time (hr.) | Temp (°C.) | PRES (MPa) | TEMP (°C.) | CO$_2$R (kg/hr-kg) | MCI (% wb) | MCE (% wb) | OILR (%) | NFMR (mL) | Whether Crushed | Found % | runs avgd. |
| 1  | 2.5 | 50 | 27.10 | 50 | 2.57 | 9.03  | 5.76 | 7.05  | 13.10 | No  | 0.0    | 1 |
| 2  | 9   | 60 | 40.34 | 51 | 2.32 | 8.83  | 5.49 | 8.27  | 19.40 | No  | 2-3    | 1 |
| 3  | 4   | 80 | 35.16 | 50 | 2.44 | 11.65 | 5.84 | 8.87  | 14.30 | No  | >5     | 1 |
| 4  | 4   | 80 | 39.58 | 51 | 2.45 | 9.54  | 6.26 | 8.39  | 20.70 | No  | >5     | 1 |
| 5  | 1   | 70 | 38.75 | 50 | 2.46 | 6.98  | 5.29 | 9.84  | 12.3  | Yes | —      | 1 |
| 6  | 3   | 70 | 33.54 | 50 | 2.55 | 7.62  | 4.98 | 9.45  | 16.30 | No  | >5     | 1 |
| 7  | 3   | 70 | 34.23 | 51 | 2.63 | 7.82  | 4.89 | 9.13  | 17.0  | No  | >5     | 1 |
| 8  | 3   | 70 | 38.20 | 50 | 2.49 | 8.02  | 5.16 | 9.16  | 15.10 | No  | >5     | 1 |
| 9  | 3   | 70 | 38.61 | 51 | 2.52 | 9.32  | 6.33 | 8.96  | 22.10 | No  | >5     | 1 |
| 10 | 4   | 70 | 37.58 | 51 | 2.53 | 10.81 | 5.45 | 10.08 | 16.50 | No  | 2.5-5  | 1 |
| 11 | 5   | 70 | 33.34 | 50 | 2.45 | 9.33  | 5.40 | 9.23  | 18.70 | No  | 2.5-5  | 1 |
| 12 | 5   | 70 | 39.99 | 51 | 2.51 | 8.09  | 5.84 | 8.92  | 16.70 | No  | 2.5-5  | 1 |
| 13 | 6   | 70 | 40.27 | 51 | 2.52 | 8.42  | 6.14 | 10.02 | 16.50 | No  | 2.5-5  | 1 |
| 14 | 7   | 70 | 33.27 | 41 | 2.53 | 13.16 | 6.28 | 7.47  | 8.70  | No  | 1.5-2  | 3 |
| 15 | 7   | 70 | 32.92 | 50 | 3.03 | 12.71 | 6.11 | 7.64  | 15.30 | No  | 1.5-2  | 1 |
| 16 | 7   | 70 | 40.47 | 50 | 2.51 | 10.02 | 5.95 | 9.94  | 17.50 | No  | 2.5-5  | 1 |
| 17 | 7   | 70 | 32.35 | 60 | 2.46 | 10.77 | 4.87 | 8.75  | 23.0  | No  | 1.5-2  | 1 |
| 18 | 7   | 70 | 37.03 | 90 | 2.90 | 9.30  | 3.51 | 10.79 | 34.67 | No  | 1.5    | 1 |

NOTE:
Humidification at 70° C. for 5-7 hrs was found adequate to protect peanuts against breaking during extraction. Also an extraction temperature of about 50-55° C. seemed conducive to reducing the extraction of non-fat material while achieving better extraction of oil. The rest of the experiments were performed with humidification at 70° C. for 7 hrs.
PRES: Pressure
TEMP: Temperature
CO$_2$R: Flow rate of CO$_2$
MCI: Moisture content immediately before extraction
MCE: Moisture content after extraction
OILR: Oil Removed, % of oil originally present
NFMR: Nonfat matter removed, mL/kg of peanuts

TABLE II

Effect of one step microwaving of humidified peanuts on the extraction of oil in the Continuous Extraction Mode (Extraction period 5 hrs)

| | Pretreatment | Extraction | | | Observations | | | | | Peanut Powder | # of |
|---|---|---|---|---|---|---|---|---|---|---|---|
| Expt. set | Microwave Time (min.) | PRES (MPa) | TEMP (°C.) | CO$_2$R (kg/hr-kg) | MCI (% wb) | MCE (% wb) | OILR (%) | NFMR (mL) | Whether Crushed | Found % | runs avgd. |
| 19 | 8   | 31.03 | 32 | 2.18 | 5.87 | 4.87 | 6.73 | 2.70 | Yes | —     | 1 |
| 20 | 6   | 30.34 | 32 | 2.16 | 6.14 | 5.47 | 6.67 | 0.20 | Yes | —     | 1 |
| 21 | 5   | 28.27 | 32 | 2.08 | 7.10 | 5.99 | 4.95 | 5.30 | Yes | —     | 1 |
| 22 | 4   | 30.34 | 32 | 2.25 | 7.18 | 5.88 | 5.94 | 1.4  | Yes | —     | 1 |
| 23 | 3   | 25.93 | 31 | 2.20 | 8.76 | 6.27 | 5.80 | 4.0  | No  | —     | 1 |
| 24 | 2.5 | 35.16 | 32 | 2.23 | 8.68 | 5.67 | 6.48 | 3.80 | No  | 1.5-2 | 1 |
| 25 | 2.5 | 31.72 | 50 | 2.69 | 7.74 | 4.20 | 8.25 | 7.25 | No  | 1.5-2 | 2 |

TABLE III

Effect of pretreatments (soaking VS humidification) on moisture content, extraction rate and kernel breakage in the continuous extraction mode (Extraction period-6 hrs).

| | Pretreatment | Extraction | | | Observations | | | | | Breakage | |
|---|---|---|---|---|---|---|---|---|---|---|---|
| Expt. set | Soaking (min.) | PRES (MPa) | TEMP (°C.) | CO$_2$R (kg/hr-kg) | MCI (% wb) | MCE (% wb) | OILR (%) | NFMR (mL) | Whether crushed | % wholes | % halves |
| 26 | —   | 35.16 | 51 | 2.60 | 4.79  | 3.50  | 11.88 | 1.30  | YES | 30.89 | 34.84 |
| 27 | 10  | 35.16 | 51 | 2.61 | 12.43 | 8.20  | 5.07  | 28.0  | NO  | 95.53 | 2.73  |
| 28 | 30  | 34.85 | 52 | 2.61 | 16.02 | 11.14 | 4.37  | 36.35 | NO  | 98.46 | 1.55  |
| 29 | 60  | 34.26 | 51 | 2.54 | 17.78 | 12.11 | 4.18  | 35.50 | NO  | 97.74 | 2.27  |
| 30 | 360 | 34.82 | 51 | 2.65 | 33.15 | 26.25 | 0.76  | 55.0  | NO  | 99.28 | 0.72  |
| 31 | HU  | 34.82 | 51 | 2.69 | 12.50 | 8.23  | 5.57  | 29.50 | NO  | 93.07 | 2.42  |

| Expt. set | Breakage | | # of runs |
|---|---|---|---|
| | % brokens | % powder | |
| 26 | 19.74 | 10.97 | 2 |
| 27 | 0.0   | 1.75  | 2 |
| 28 | 0.0   | 0.0   | 2 |
| 29 | 0.0   | 0.0   | 2 |
| 30 | 0.0   | 0.0   | 1 |

TABLE III-continued

Effect of pretreatments (soaking VS humidification) on moisture content, extraction rate and kernel breakage in the continuous extraction mode (Extraction period-6 hrs).

| | | | | |
|---|---|---|---|---|
| | 31 | 2.23 | 2.30 | 2 |

HU - Humidification at 70° C., 7 hrs

TABLE IV

Effect of pretreatments (soaking VS humidification) on free fatty acids (FFA) content and peroxide value (PV) of extracted oil.

| Expt. Set | FFA as % Oleic acid | PV | # of Runs Averaged | REMARKS |
|---|---|---|---|---|
| | 0.16 | 0.45 | 1 | Control raw (unpretreated) peanuts extracted with nonsupercritical means |
| 37 | 0.75 | 2.15 | 1 | Hold-and-extract process (Mode FIG. 2A) - Extracted oil - Time 0 |
| | 0.10 | 1.34 | 1 | Hold-and-extract process (Mode FIG. 2A) - Residual oil - Time 0 |
| | 0.11 | 2.97 | 1 | Hold-and-extract process (Mode FIG. 2A) - Residual oil - Time 2 months |
| | 0.12 | 17.11 | 1 | Hold-and-extract process (Mode FIG. 2A) - Residual oil - Time 4 months |
| 26 | 1.10 | 2.96 | 2 | Pretreatment - none |
| 27 | 1.53 | 27.34 | 2 | Pretreatment - soaking 10 min. |
| 28 | 1.60 | 44.65 | 2 | Pretreatment - soaking 30 min. |
| 29 | 1.17 | 52.52 | 2 | Pretreatment - soaking 60 min. |
| 30 | 1.48 | N.D. | 1 | Pretreatment - soaking 360 min. |
| 31 | 2.09 | 9.21 | 2 | Pretreatment - humidification (70° C., 7 hours) |

NOTES:
N.D.: Not determined

TABLE V

Effect of pretreatments (soaking VS humidification) on loss of soluble solids (SS), total solids (TSj) and carbohydrates a glucose (CARBO).

| | Loss of Soluble Solids (SS) in Soaking Water | | | Loss of Soluble Solids (SS) in Co-Extracted Water Phase (NFMR) | | | Total Soluble Solids Lost in Soaking Water + Extract | | |
|---|---|---|---|---|---|---|---|---|---|
| Expt. set | % TS | CARBO. Conc. micro-eq/ml | % CARBO. | CARBO. conc. micro-eq/ml | NFMR. mL (Table III) | g/kg of peanuts | g/kg of peanuts | # of Runs Averaged | Remarks |
| 26 | No water | No water | | N.D. | 1.30 | | | 2 | Pretreatment-none |
| 27 | 0.71 | 21.69 | 0.39 | 0.15 | 28.00 | 0.0008 | 7.10 | 2 | Pretreatment-soaking 10 min |
| 28 | 1.08 | 30.97 | 0.56 | 0.16 | 36.35 | 0.0010 | 10.20 | 2 | Pretreatment-soaking 30 min |
| 29 | 1.40 | 37.73 | 0.68 | 0.34 | 35.50 | 0.0022 | 14.00 | 2 | Pretreatment-soaking 60 min |
| 30 | 3.33 | 134.07 | 2.41 | N.D. | 55.00 | N.D. | 33.30 | 1 | Pretreatment-soaking 360 min |
| 31 | No water | No water | | 0.34 | 29.50 | 0.0018 | 0.00 | 2 | Pretreatment-humidification |

NOTES:
N.D.: Not determined
NFMR: Nonfat matter removed

TABLE VI(a)

Effect of pretreatments on colour of extracted peanuts & extracted oil.
Colour Measurement Summary

| Illum D65 White standard | L 91.32 | | | | a −1.05 | | | | b 1.31 | | | | | |
|---|---|---|---|---|---|---|---|---|---|---|---|---|---|---|
| Expt. Set | Raw Pnts. | Pretr. Peanuts | Extr. Pnts. | Extr. Oil | Raw Pnts. | Pretr. Peanuts | Extr. Pnts. | Extr. Oil | Raw Pnts. | Pretr. Peanuts | Extr. Pnts. | Extr. Oil | # of Runs Averaged | Remarks |
| 26 | 62.27 | No treatment | 74.82 | 57.57 | 3.36 | No treatment | 1.52 | −3.54 | 19.36 | No treatment | 17.36 | 23.64 | 2 | Prtr.-None |
| 27 | | 53.54 | 69.26 | 58.75 | | 4.54 | 1.63 | 3.29 | | 19.54 | 15.15 | 25.93 | 2 | Prtr.-Soak. 10 min. |
| 28 | | 51.23 | 60.39 | 61.64 | | 4.80 | 3.39 | 2.82 | | 19.29 | 16.77 | 24.68 | 2 | Prtr.-Soak. 30 min. |
| 29 | | 53.98 | 58.24 | 64.44 | | 4.51 | 3.67 | 0.71 | | 19.45 | 16.91 | 12.78 | 2 | Prtr.-Soak. 60 min. |
| 30 | | 64.59 | 53.75 | N.D. | | 2.15 | 3.01 | N.D. | | 16.79 | 17.05 | N.D. | 1 | Prtr.-Soak. 360 min. |
| 31 | | 52.13 | 67.70 | 63.68 | | 4.74 | 1.97 | −1.88 | | 19.27 | 17.21 | 25.22 | 2 | Prtr.-Humidification |

Pnts. = peanuts

TABLE VI(b)

Effect of pretreatments on colour of extracted peanuts & extracted oil.
Colour Measurement Summary

| Illum D65 White standard | | | Total color dif. = Delta E with respect to Raw Peanut 34.49 | | | | Chromaticity dif. = Delta C with respect to raw peanut 18.58 | | | | Ratio a/b 0.80 | | | |
|---|---|---|---|---|---|---|---|---|---|---|---|---|---|---|
| Expt. Set | # of runs Averaged | Remarks | Raw Pnts. | Prtr. Pnts. | Extr. Pnts. | Extr. Oil | Raw Pnts. | Prtr. Pnts. | Extr. Pnts. | Extr. Oil | Raw Pnts. | Prtr. Pnts. | Extr. Pnts. | Extr. Oil |
| 26 | 2 | Prtr.-None | 0.00 | | 12.84 | 9.38 | 0.00 | | 2.72 | 8.11 | 0.17 | | 0.09 | −0.15 |
| 27 | 2 | Prtr.-Soak. 10 min | | 8.81 | 8.35 | 7.45 | | 1.19 | 4.56 | 6.57 | | 0.23 | 0.11 | 0.13 |
| 28 | 2 | Prtr.-Soak. 30 min | | 11.13 | 3.20 | 5.38 | | 1.44 | 2.59 | 5.34 | | 0.25 | 0.20 | 0.11 |
| 29 | 2 | Prtr.-Soak. 60 min | | 8.37 | 4.72 | 7.42 | | 1.16 | 2.47 | 7.10 | | 0.23 | 0.22 | 0.06 |
| 30 | 1 | Prtr.-Soak. 360 min | | 3.67 | 8.84 | | | 2.84 | 2.34 | | | 0.13 | 0.18 | |
| 31 | 2 | Prtr.-Humidification | | 10.23 | 6.01 | 7.99 | | 1.39 | 2.57 | 7.99 | | 0.25 | 0.11 | −0.07 | dif. = difference

TABLE VII

Comparison of Continuous Extraction mode with Hold-and-Extract Process
(Mode FIG. 2a) (Net extraction period 6 hrs)

| | Pretreatment Humidification | | Extraction | | | Observations | | | | | | |
|---|---|---|---|---|---|---|---|---|---|---|---|---|
| Expt. set | Time (hrs) | Temp (°C.) | Pres (MPa) | Temp (°C.) | $CO_2R$ (kg/hr-kg) | MCI (% wb) | MCE (% wb) | OILR (%) | NFMR (mL) | Whether Crushed | Ext. Mode | # of runs |
| 16 | 7 | 70 | 40.47 | 50 | 2.51 | 10.20 | 5.95 | 10.17 | 19.50 | No | Con. | 1 |
| 31 | 7 | 70 | 34.82 | 51 | 2.69 | 12.50 | 8.23 | 5.57 | 32.00 | No | Con. | 2 |
| 32 | 7 | 70 | 38.61 | 61 | 2.22 | 10.63 | 6.52 | 15.78 | 39.30 | No | H&E Proc. | 2 |

H&E Proc. = hold-and-extract process mode
Con. = continuous extraction mode

TABLE VIII

Comparison of the effect of different Hold and Extract modes (FIG. 2a, 2b, 2c) on the
extraction of oil from the peanuts conditioned with multistep humidification-microwave pretreatment.

| | | Extraction | Extraction | | | Observations | | | | | # of |
|---|---|---|---|---|---|---|---|---|---|---|---|
| Expt. set | Extraction Mode | Time (Net) (hrs) | Pres (MPa) | Temp (°C.) | $CO_2R$ (kg/hr-kg) | MCI (% wb) | MCE (% wb) | OILR (%) | NFMR (mL) | whether crushed | runs avgd. |
| 36 | FIG. 2a | 6 | 43.23 | 62 | 2.36 | 11.44 | 6.78 | 20.35 | 43.03 | No | 3 |
| 37 | FIG. 2a | 12 | 44.63 | 60 | 2.56 | 10.29 | 2.59 | 26.56 | 37.33 | No | 3 |
| 38 | FIG. 2b | 6 | 43.62 | 61 | 2.35 | 9.56 | 4.98 | 22.26 | 37.03 | No | 4 |
| 39 | FIG. 2b | 12 | 45.07 | 60 | 2.55 | 9.56 | 2.55 | 28.36 | 37.17 | No | 3 |
| 40 | FIG. 2c | 6 | 43.86 | 61 | 2.49 | 11.24 | 5.86 | 21.92 | 41.50 | No | 3 |
| 41 | FIG. 2c | 12 | 45.62 | 60 | 2.54 | 9.21 | 2.74 | 31.79 | 48.33 | No | 3 |

NOTES:
a) for the data in the above Table multiple-step humidification and microwave pretreatment was applied
b) in the case of hold-and-extract process mode (net extraction 12 hr) about 2.5-5% peanut powder was found after extraction at the bottom of the extraction vessel
Multiple step humidification + microwave pretreatment:
Humidification (70° C., 7 hr) + microwave in monolayers (2.5 min)-conditioning-remicrowaving (2 min)-rehumidification (40° C., 4 hr)
Conditioning: humidified and microwaved peanuts were kept overnight in the humidification vessel, spread uniformly to equilibrate any temperature and moisture gradients within the peanut kernels.

We claim:

1. A process capable of preparing unbroken nut kernels of significantly reduced calorific value suitable for use as a snack food, comprising the steps of:
   a) humidifying shelled non-roasted nut kernels by contact with water vapor, in a manner substantially avoiding the presence of free moisture on the kernels, to bring the moisture content to a level sufficient to prevent the kernels from breaking during subsequent extraction;
   b) placing the humidified kernels in an extraction vessel and exposing the kernels to carbon dioxide under supercritical fluid conditions of temperature and pressure to extract oils from the kernels, said extraction being performed in one or more hold and extract stages with removal and replenishment of carbon dioxide occurring during the extract stage or stages; and
   c) removing the calorie reduced kernels.

2. The process according to claim 1, wherein the nuts are selected from the group consisting of almonds, cashews, pistacchios, Brazil nuts and hazel nuts.

3. The process according to claim 1 wherein the carbon dioxide atmosphere in the holding periods is maintained under supercritical conditions.

4. The process according to claim 1 wherein the carbon dioxide in at least some of the holding periods is liquid carbon dioxide.

5. The process according to claim 1 wherein the extraction step is followed by a partial reduction of the carbon dioxide pressure.

6. A process according to claim 1, wherein the nuts are peanuts, and the humidifying step is such as to bring the moisture content to between 7 and 14 weight % on the wet basis.

7. The process according to claim 6 wherein the peanut kernels are humidified at a temperature in the range 30°-80° C. for a time sufficient to bring the moisture content of the kernels to from 8 to 11 wt %.

8. The process according to claim 6 wherein following the humidification step, the kernels are subjected to microwave energy for a time sufficient to enhance the permeability of the cell walls without causing the moisture content to drop below about 7%.

9. A process according to claim 1, wherein the nuts are peanuts, and wherein the extraction is carried out at a temperature in the range 31.05°–90° C. and under a pressure in the range 25–50 MPa for a time effective to extract a desired amount of oil from the kernels.

10. The process according to claim 9 wherein the temperature is 50°–65° C. and the pressure is 35–50 MPa.

11. The process according to claim 9 wherein the extraction is carried out in stages preceded, and separated by, periods of holding the peanuts in the atmosphere of supercritical $CO_2$ under the prevailing extraction temperature and pressure.

12. A process according to claim 1, wherein the pressure in the extraction vessel is held at supercritical conditions for the hold stages.

13. A process according to claim 1, wherein the humidifying step is carried out with a mixture of water vapor and an inert gas selected from the group consisting of nitrogen and carbon dioxide.

14. A process according to claim 1, wherein the humidifying step is carried out with water vapor produced by a humidifier vessel heated by a water bath.

15. A process according to claim 1, wherein the pressure in the extraction vessel is varied in a controlled manner during as the extraction progresses.

16. A process for preparing peanuts of reduced calorific value, comprising a humidification step involving contacting non-roasted unbroken nut kernels with water vapor in a manner substantially avoiding the presence of free moisture on the kernels, and so as to bring the moisture content of the kernels to from about 7 to about 14 weight % on the wet basis, and subjecting the kernels to microwave energy for a time sufficient to enhance permeability of the cell walls without causing the moisture content to drop below about 7%, the humidification and exposure to microwave energy being effected in alternate stages, and subsequently extracting the nut kernels with carbon dioxide under supercritical conditions of temperature and pressure.

17. A process for preparing unbroken nuts of reduced calorific value, comprising providing unbroken non-roasted nut kernels with a moisture content sufficient to prevent the kernels from breaking during a subsequent extraction stage, said extraction stage involving extracting the kernels with carbon dioxide under supercritical fluid conditions of temperature and pressure in an extraction vessel, wherein the pressure in the extraction vessel is varied in a controlled manner as the extraction progresses.

* * * * *